2,798,853

LUBRICANT CONTAINING HYDROGENATED LIQUID POLYMER OILS

David W. Young, Westfield, and Delmer L. Cottle, Highland Park, N. J., assignors to Esso Research and Engineering Company, a corporation of Delaware No Drawing. Original application May 27, 1954, Serial No. 432,936. Divided and this application November 1, 1954, Serial No. 466,204

3 Claims. (Cl. 252—46.6)

This application relates to a method of improving liquid polymer oils and more particularly relates to the preparation of new class of addition agents from such oils.

It is known to prepare oily polymers by the polymerization of a conjugated diolefin such as butadiene or the copolymerization of such a diolefin with a vinyl aromatic such as styrene. These polymeric oils have been found to be excellent drying oils and therefore useful in preparing varnishes, paints and enamels.

However, the films prepared from these oils have been found prone to check or fracture badly on exterior exposure and finally to flake away from the supporting surface. Furthermore, baked films prepared from these oils, while superior to most synthetic drying oils, still are not as satisfactory as those obtained from most natural drying oils.

According to the present invention such polymer oils are subjected to hydrogenation to improve the weather resistance and adhesion of the baked films and other properties of the oil and to obtain products suitable as plasticizers for natural and synthetic rubber, polyethylene, asphalt and wax and as addition agents for lubricating oils and the like.

The polymer oil which is to be subjected to hydrogenation, according to this invention, is prepared by copolymerizing about 50 to 100 parts of butadiene-1,3 and about 50 to 0 parts of styrene at 25 to 105° C. in the presence of 1.2 to 8 parts of finely divided sodium, per 100 parts of monomers, as the catalyst and of about 50 to 500 parts of an inert hydrocarbon diluent boiling between 0 and 250° C., preferably between 20 and 200° C. in either a batch or continuous process.

The above choice of monomers is quite specific as halogen-containing monomers such as chloroprene or chlorinated styrene are not suited for polymerization in the presence of sodium. Higher homologues of butadiene i. e. piperylene, isoprene, and dimethylbutadiene are suitable for the purpose of the present invention. The replacement of styrene by its ring alkylated homologues, such as para-methyl styrene, meta-methyl styrene, dimethyl styrene and the corresponding ethyl substituted homologues is the only variation of monomers permissible herein, however, styrene is the most practical from the economic standpoint. Alpha methyl styrene is unsuitable because it is too unreactive toward sodium.

Materials used as diluents in the polymerization should be liquid at the polymerization temperature, that is, they should boil between 20 and 250° C., although more volatile materials boiling as low as $-15°$ C. may also be used, providing that the polymerization pressure is increased correspondingly. Preferred diluents are essentially aliphatic hydrocarbons such as naphtha (boiling range about 90 to 120° C.), or straight run mineral spirits such as Varsol (boiling range about 150 to 200° C.), but butane, pentane, benzene, toluene, xylene, cyclohexane, butenes, pentenes or similar inert hydrocarbons are also usable, individually or in admixture with each other. In general, the aromatic solvents are not so desirable as the aliphatic ones because of the toxicity of the former. The hydrocarbon diluents are used in amounts ranging from 50 to 300 parts by weight per 100 parts of monomers.

An important feature of the process involves the use of a substantial amount of certain $C_4$ to $C_8$ aliphatic ethers as codiluents or modifiers along with the hydrocarbon diluent described above. A particularly outstanding promoter for the batch process has been found in dioxane-1,4 whose presence in the feed aids in the production of a colorless product of desirable viscosity and good drying properties, and promotes the reaction sufficiently to give 100% conversion at 50° C., in a period of about 6 to 12 hours. Similarly favorable results were also obtained with diethyl ether ($C_2H_5)_2O$, as well as with methylal, ethylal, methyl acetal, and tertiary butyl methyl ether. In the batch process, diethyl ether is usable, although the initial induction period tends at times to be somewhat long. However, diethyl ether is the preferred ether in a continuous process as the difficulty in starting up the reaction occurs only at the beginning of the polymerization which runs for a long period of time in contrast to batching runs which have to be started up frequently. Diethyl ether is less subject to undesirable side reactions with metallic sodium, and it is a more vigorous promoter than dioxane. However, dioxane is usable also, but not preferred. Other ethers useful to a still lesser extent are diethyl acetal, vinyl isobutyl ether, dihydropyrane and ethylal, all of which have a favorable effect on improving the color of the product.

In contrast to the preferred ethers named earlier herein, the four ethers just named have a moderate retarding effect on the polymerization rate. Finally, all cyclic ethers having an O—C—O— group in a ring structure, such as dioxane-1,3, dioxolane, paraldehyde and glycol ethylidene diacetal, inhibit the polymerization rate so excessively that their use is impractical. Dimethyl ether also does not serve the desired purpose, both as regards reaction rate and product quality. Thus the cyclic ethers must have the oxygen atoms separated by at least two carbon atoms.

The ether promoter is used in amounts ranging from about 1 to 100 parts, preferably 5 to 50 parts by weight per 100 parts of monomers. In selecting the ether codiluent it is especially desirable in many cases to select an ether having a boiling point of at least 10° C. below the lower limit of the boiling range of the hydrocarbon diluent, and thus, when using a mineral spirits having a boiling range of 150° C. to 200° C., ether co-diluents boiling between about 25 and 140° C., are preferred for the reason that their separation from the hydrocarbon diluent in the polymerized reaction mixture is greatly facilitated by virtue of the stated difference in boiling points. If the polymer is recovered in about 100% purity, the ether may conveniently boil in the range of the hydrocarbon diluent since both may be recycled together in making up the fresh feed to the reactor.

It is also advantageous to use about 10 to 50%, preferably 10 to 30 weight percent (based on sodium) of an alcohol in the polymerization recipe. Suitable alcohols include isopropanol, isobutanol, isopentanol, secondary butanol, and tertiary butanol. The coarser the catalyst dispersion, the more essential it is to have a sufficient amount of alcohol promoter present.

The reaction time and induction period vary depending on the degree of catalyst dispersion, reaction temperature, purity of feed materials and sequence of monomer addition.

The catalyst is usually fed to the reactor as a slurry of metal particles dispersed in 2 to 200 parts by weight of a hydrocarbon liquid, which may or may not be the same as the reaction diluent. Agitation of the reaction mixture during synthesis increases the efficiency of the catalyst.

Destruction of catalyst at the end of the reaction is effectively accomplished by adding to the reaction mixture a moderate excess of an anhydrous $C_1$ to $C_5$ fatty acid which is soluble in the hydrocarbon mixture, e. g. formic, acetic or pentanoic, or with sulfuric acid as described in copending application Serial Number 396,324, filed December 4, 1953. After destruction of the catalyst the crude polymerization product containing the salts, excess acid and other impurities is neutralised with ammonia, and the neutralized product is finally filtered preferably with a filter aid such as silica gel, clay, charcoal or its equivalent. Separation can also be accomplished by centrifuging, if desired. Other ways of destroying the catalyst may be used, such as by adding alcohol, or inorganic acids.

Since the resulting polymer solution is usually too dilute for most practical use as a varnish or enamel base, it is advantageous to distill off some of the volatile hydrocarbon solvent until a product containing not less than 40% to 70% non-volatile matter is obtained, the non-volatile matter being the polymeric drying oil. Where even more highly concentrated products are desired it is possible to raise the concentration of the polymeric drying oil to as much as 99% or greater non-volatile matter by still more extensive distillation or stripping; the use of a stripping gas, such as methane or a mixture of light hydrocarbons, is advantageous where highly concentrated drying oils are desired. Alternatively, one may use a low boiling diluent such as butane, a pentane, or a low boiling naphtha in the synthesis step and thus simplify the eventual removal of the diluent from the polymeric product.

The product of the present invention is usually a solution of polymeric drying oil in a suitable hydrocarbon solvent such as solvent naphtha or mineral spirits and is, depending on the amount and type of ether used, a clear, colorless to light yellow varnish composition, the polymer content of which has a viscosity of about 0.15 to 22 poises at 50% N. V. M. and preferably 0.15 to 3.0 poises at 50% N. V. M.

If desired, the product viscosity can be readily increased within or above the limits given above by heat-bodying the polymer, preferably in 50 to 75% concentration, in the absence of air at temperatures between 200 and 300° C., e. g. at 220 to 260° C. The clear varnish composition can be brushed, poured or sprayed and gives good clear films on drying in air or baking, especially when conventional driers such as naphthenates or octoates of cobalt, lead or manganese are added thereto. Excellent film can be prepared by baking, even in the absence of driers.

Furthermore, when the drying oil compositions of the present invention are intended for use in pigmented enamels, their gloss and wetting power can be further improved by reacting them with a small amount of a polar compound such as maleic anhydride, acrylonitrile, thioglycollic acid or other equivalent materials described in copending applications Ser. Nos. 102,703, filed July 16, 1949 (now issued as Patent No. 2,652,342) and 106,487, filed July 23, 1949, now Patent No. 3,683,162.

Lead driers can be used also, but, unlike in the case of natural drying oil varnishes, are not necessary here. This, of course, is a decided advantage in some cases in view of the toxicity of the lead driers.

Another important advantage of the invention is that the present drying oils can be used as a varnish without the addition of any extraneous polymer or resin thereto. This further distinguishes the products of the invention from prior art drying oils, notably the natural oils such as linseed, which require the addition of rosin, ester gum or a phenolic resin thereto when a varnish is desired.

Now, according to the present invention, a polymer oil made as described above is subjected to hydrogenation to reduce its color and iodine number and effect other improvements. This hydrogenation may be carried out either by treating the polymer before stripping out part or all of the diluent hydrocarbons or the stripped polymer may be redissolved in a suitable inert solvent to facilitate hydrogenation in the liquid phase.

The hydrogenation may be carried out under any desired hydrogenating conditions, such as contacting the polymer solution with gaseous hydrogen under a pressure of about 100 to 5000 p. s. i. g. preferably about 500 to 3000 p. s. i. g., at a temperature range from about 200 to 500° F., preferably about 300 to 450° F. for a time ranging from a few minutes to several days, but preferably about 10 to 30 hours. In order to avoid gel formation by crosslinking, it is necessary that the hydrogenation be carried out gradually as instantaneous hydrogenation results in the production of an insoluble product. It is preferred to use a hydrogenation catalyst, which may be any of the known types such as nickel, reduced nickel, platinum, or various metal sulfides, etc., either alone or supported on a suitable carrier of great porosity or surface area, e. g. charcoal, silica gel, etc. In batch operation, the amount of catalyst should generally be about 5 to 50% by weight, based on the weight of polymer subjected to hydrogenation. In continuous hydrogenation, the feed rate of the polymer or the polymer solution through the catalyst bed should be about 0.1 to 5, preferably 0.3 to 1.0 v./v./hr.

After the hydrogenation is completed, i. e. carried out to the desired pressure drop or reduction in iodine number, and improvement in color or other characteristics, the solution may be subjected to flashing or distillation to remove the solvent and any other volatile materials, and if desired, the hydrogenated polymer may be stored, shipped, or otherwise marketed for use while still dissolved in the hydrogenation solvent. In such a case, however, it should be subjected to filtering or other purification treatment to remove the catalyst.

These hydrogenated polymers have iodine numbers between 1 and 150 and have value as varnish extenders, for cobodying with other resins and/or drying oils, for floor tile compositions, printing inks, paints, as bonding agents for plywood, as plasticizers for natural rubber and synthetic rubbers, such as butyl rubber, GR–S, GR–N, asphalt, polyethylene and wax, and as addition agents for lubricating oils and the like. The proportions may vary between 1 and 30% of the hydrogenated oil.

The hydrogenated copolymers as described above have been found to have lubricating oil and wax modifying characteristics which make them particularly desirable for blending with various lubricating oil base stocks and waxes. It has been found that either natural occurring mineral oils or synthetic lubricating oils may be improved by the addition of minor but improving proportions of the hydrogenated polymers described above.

It has also been found that the residual unsaturation present in the hydrogenated polymeric materials make it possible to further react the hydrogenated polymeric material with agents such as sulfides of phosphorus, chlorinated aliphatic compounds, acylating agents, sulfonating agents and the like. These reaction products also enhance the desirable characteristics of lubricating oils and waxes with which they are blended.

The objects, advantages and details of the invention will be better understood from the following experimental data which are given for the sake of illustration, but without intending that the invention be limited specifically thereby.

EXAMPLE I

An oily copolymer of butadiene and styrene was prepared according to the following recipe:

| | | |
|---|---|---|
| Butadiene | parts by weight | 80 |
| Styrene | do | 20 |
| Varsol | do | 10 |
| Naphtha | do | 190 |
| Dioxane | do | 30 |
| Sodium | do | 1.5 |
| Isopropanol | do | 0.3 |
| Temperature | ° C | 40 |

Complete conversion was obtained in 10 hours. The catalyst was destroyed and removed. The product was finished to 90% N. V. M. as described above and had a viscosity of 1.0 poise at 50% N. V. M.

EXAMPLE II 83 g. of the product of Example I was placed in 220 g. heptane and 25 g. of Raney nickel catalyst was added. The mixture was placed in a 1.9 liter bomb. Hydrogen was continuously added at 25° C. until a pressure of 380–540 lbs. was obtained. The temperature was increased slowly over a period of 24 hours until it reached 250° C. Final hydrogen pressure was 2400 to 3000 lbs. After removal of the solvent, a colorless product having an iodine number of 18 was obtained.

EXAMPLE III 83 g. of the copolymer prepared as described in Example I above was placed in a 1.9 liter bomb and a catalytic amount of Raney nickel catalyst was added along with about 200 g. heptane. The bomb was pressurized with hydrogen to a pressure of between about 1850 and 2400 lbs. The temperature was raised to 190° C. and increased after a few hours to 270° C. After from 16 to 21 hours of reaction time, a colorless, stable hydrogenated polymer was obtained that had a molecular weight of about 8,000 Staudinger and an iodine number of about 6. The iodine number of the starting material was 313. This hydrogenated polymer was blended with a highly refined paraffinic distillate having a viscosity at 210° F. of 45 SUS and a viscosity index of 113. The blend containing 1½% of the hydrogenated polymer had a viscosity at 210° F. of 51.7 SUS and a viscosity index of 127. A blend containing 2½% of the hydrogenated copolymer had a viscosity at 210° F. of 56.3 SUS and a viscosity index of 131.5.

EXAMPLE IV

The copolymer of Example I above was hydrogenated in heptane solution at 250° C. at 2400 to 3000 lbs. hydrogen pressure. The resulting material had an ASTM iodine No. of 18.

This hydrogenated copolymer was blended in a paraffin wax and standard wax inspection evaluations carried out. Results are set out below.

| Percent Hydrogenated Copolymer | M. Pt., °F. | Viscosity at 250° F., cs. | ASTM Penetration, 77° F. |
|---|---|---|---|
| 0 | 131.8 | 2.4 | 9 |
| 1 | 132.0 | 2.7 | 12 |
| 5 | 131.8 | 4.3 | 15 |
| 20 | 131.3 | 7.3 | 23 |

As another concept of the instant invention it is contemplated that the hydrogenated copolymer be subjected to chemical treatment by phosphorizing alone, or in conjunction with sulfurizing, the chemical treatment either being carried out to a greater or more severe extent in order to impart extreme pressure lubricating, or antioxidant, or other valuable properties to the copolymer.

This chemical treatment may be carried out in a number of different ways. For instance, for phosphorizing alone, the treating agent may comprise either elemental phosphorus or a phosphorizing compound such as a phosphorus oxyhalide, e. g., $POCl_3$, $POBr_3$, etc., phosphorus pentoxide $P_2O_5$, etc., or mixtures thereof. A preferred class of treating agents is one comprising phosphorus and also an element of the sulfur family which includes sulfur, selenium and tellurium. Such an agent, which may be considered as of the P.Y type, where Y is a member of the sulfur family, may consist of a simple mixture of for instance, phosphorus or sulfur, or a compound of these two elements, e. g., $P_2S_5$, $P_4S_3$, $P_2S_3$, $P_4S_7$, $P_2Se_5$, etc., or mixtures of such compounds with either or both of the individual elements.

Another preferred class of treating agents may be considered of the P.Y.X. type, where Y is the same as above, and X represents halogen. Examples of such agents include $PSCl_3$, $PSBr_3$, $PSFBr_2$, $PSF_2Br$ and $P_2S_3Br_4$. Such agents may readily be made by reacting the appropriate phosphorus halide with hydrogen sulfide; for instance, $PSBr_3$ is made from $PBr_5$ and $H_2S$. A still further type of treating agent is one of the P.O.Y. type, where Y has the same meaning as above, as in the compound $P_4O_6S_4$. Mixtures of any of the above types of treating agents may be used.

Another modification of the invention comprises first sulfurizing the hydrogenated copolymer and then phosphorizing it. In such a case, the sulfurizing may be effected by heating the copolymer alone or together with a suitable solvent, e. g., carbon disulfide, with elemental sulfur, or by reacting with a sulfurizing compound of the Y.X type, where Y and X have the same meanings as above, as in the case of sulfur monochloride $S_2Cl_2$, sulfur dichloride $SCl_2$, sulfur monobromide $S_2Br_2$, etc. The subsequent phosphorizing treatment may then be carried out by treating with elemental phosphorus or a phosphorizing compound such as $POCl_3$, $POBr_3$, $PCl_3$, $P_2S_5$, $P_2O_5$, etc., or mixtures thereof.

A still further modification of the invention comprises first sulfonating the copolymer as by treatment with fuming sulfuric acid of 5 to 20% fuming concentration, at relatively mild temperatures, or by commercial, concentrated sulfuric acid, or even weaker acid, at higher temperatures, and in higher proportion to the amount of copolymer treated. The resultant sulfonated copolymer is then phosphorized in the same manner as described above for treatment to follow a sulfurizing step.

In carrying out the above described chemical treatment, the amount of treating agent will, of course, vary, depending upon the types of copolymer and treating agent used, and the extent of chemical modification desired, but normally will range from about 0.1 to 5% by weight of treating agent based on the weight of the copolymer treated. The temperature of reaction will, of course, also vary inversely with the strength and amount of treating agent, and extent of modification desired, but normally will range from about room temperature to about 250° C. or so, generally about 100 to 200° C.

The reaction is also preferably carried out in the presence of an inert liquid serving as solvent and/or a diluent such as paraffinic hydrocarbons e. g., petroleum ether or refined higher boiling fractions such as naphtha, kerosene, gas oil or lubricating oil.

After the treatment with a phosphorus sulfide or other treating agent described above, the reaction mixture should be filtered and distilled, or otherwise treated if necessary to remove any volatile solvent, and if desired, the product may be neutralized or partially neutralized with a basic metal neutralizing agent such as one of the following metals in finely-divided form: calcium, barium, magnesium, aluminum, tin, nickel, cobalt, sodium, potassium, etc., or oxides, hydroxides, carbonates or other suitable compounds of such metals. After such neutralization, the final product should be filtered to remove unreacted neutralizing agent.

Another important modification of the invention is carrying out the above described chemical treatment of a copolymer, in the presence of a fatty oil such as one or more of the various vegetable oils, e. g., soybean oil, linseed oil, cottonseed oil, or animal oils, e. g., lard oil, etc., or fish oils, e. g., whale oil, sperm oil, etc. When thus phosphorizing the copolymer in the presence of a fatty oil such as those described above, it is believed that not only are the copolymer and fatty oil each separately phosphorized, but also it is believed that there is some co-reaction between these materials so that either some condensation of the fatty oil with the copolymer takes place through the medium of the phosphorizing treatment, either alone or in conjunction with the sulfurizing treatment, or in any event, the resultant product is considered to be more stable and more effective than if the materials were separately treated and then mixed together alone or added to a lubricating oil.

A preferred method of carrying out the invention is to carry out the chemical, e. g., phosphorizing, treatment of the copolymer while dissolved in a portion of a lubricating oil, so as to make a concentrate of the treated product, which can then readily be diluted with further amounts of lubricating oil, to make a lubricant of the desired final composition. In such a case, the concentrate may advantageously contain from 1 to 50%, preferably about 5 to 30%, of the treated copolymer, and the finished blend should ordinarily contain an amount of treated polymer ranging from about .01% to about 10%, preferably about 0.1 to 5.0%.

An example of the phospho-sulfurization of these copolymers is given below.

EXAMPLE V

The hydrogenated copolymer prepared as described in Example III above was dissolved in 5% concentration in a paraffinic mineral lubricating oil having a viscosity of 52 SUS at 210° F. and a viscosity index of 100. 5 g. of $P_2S_5$ was then added to 100 g. of the blend and the mixture heated to 180° C. for 60 minutes. The solution was cooled to room temperature and filtered through a layer of Hiflo filter aid on paper. The clear solution was analyzed and found to contain 2.61 weight percent sulfur and 0.783 weight percent phosphorus. This blend, when tested on the standard Almen machine, an extreme pressure testing machine, carried the full load of 15 weights with gradual loading. The same base oil, this base oil containing 5% concentration of the hydrogenated copolymer which was not treated with $P_2S_5$, or the base oil alone treated with $P_2S_5$ as above would not carry all the weights in this test.

It is also within the concept of this invention to react the hydrogenated copolymer of this invention with a dihalogenated or other polyhalogenated organic compound such as a dihalogenated hydrocarbon compound having the general formula $RX_2$ where R represents a hydrocarbon group and X represents halogen, attached to R through aliphatic carbon linkages. Examples of such reagents include ethylene dichloride, propylene dichloride and higher alkylene dichloride, as well as corresponding bromide derivatives, or mixtures of two or more different alkylene halide compounds. Other polyhalogenated hydrocarbons such as trichloro trifluoro propylene, dimer and trimer of trichloro trifluoro propylene, difluoro ethane, $CCl_4$, trifluoroalkyl alkyl ethers, carbon tetrafluoride (Freon 14), 1-chloro-1, 1-di fluoro ethane (Freon 142), chloropentafluoro ethane (Freon 115) and the like may be used. Higher molecular weight reagents for reacting with the hydrogenated copolymer may be prepared for instance by halogenating paraffin wax or other paraffinic hydrocarbons such as cetane, octadecane, triisobutylene, polymethyl pentadiene, polypropylene, polybutene, polyethylene, butyl rubber, etc. It will be understood of course that when such hydrocarbons are halogenated, for example chlorinated, the resulting product will generally consist of a mixture of monochlor, dichlor and/or trichlor derivatives, depending essentially upon the total amount of chlorine combined into the hydrocarbon product. For the purposes of the present invention, the amount of incorporated halogen (or mixed halogen) should usually range from about 10–30%, preferably from about 10 to 15 or 20%. Very good results have been obtained with chlorinated paraffin wax containing from 12 to 14% of chlorine. Such a product containing for instance 12% of chlorine probably contains monochlorinated wax molecules and dichlorinated wax molecules in approximately the same proportion. If the total product contains above about 14% of chlorine, however, the proportion of dichlorinated molecules probably slightly exceeds the proportion of monochlor molecules. Good results have been obtained with a wax that contained 2% fluorine and 14% chlorine. Also interesting results have been obtained on a wax that contained a trace of Br, 1% of F and 14% chlorine.

The condensation of the halogenated hydrocarbons with the hydrogenated copolymer should preferably be carried out in the presence of a Friedel-Crafts condensation catalyst such as aluminum chloride, boron fluoride, $AlBr_3$, $AlBr_2Cl$, $AlCl_2Br$, $Al_2Br_5Cl$, $(Al_2Br_5Cl.AlOBr)$, $(AlCl_2OH.AlCl)$ etc. The reaction is also preferably carried out in the presence of a solvent, which may be either inert under the conditions of the reaction, such as tetrachlorethane, carbon tetrachloride, etc., or it may be an aromatic type of solvent, such as benzene, toluene, or a petroleum aromatic naphtha, which is capable of condensing with one of the two halogen atoms on the dihalo hydrocarbons used as reagents. A refined heavy petroleum naphtha may be used, which consists chiefly of saturated hydrocarbons and a small amount of aromatics.

The following is an example of this concept of the invention.

EXAMPLE VI

The hydrogenated copolymer prepared as described in Example III (15 g.) was reacted with a chlorinated wax containing 11% chlorine (4.8 g.) 3% of aluminum chloride was used as a catalyst and the solvent for the reaction was kerosene (125 g.). The temperature of the reaction was maintained at between 115° and 135° C. When the reaction was completed, the product was washed with water and stripped to remove the solvent. This material was blended with a naphthenic distillate having a viscosity at 210° F. of about 56 SUS, an ASTM pour point of +20 and a viscosity index of 103. A blend containing 0.5% of the alkylated hydrogenated copolymer had an ASTM pour point of −5° F. and a viscosity index of 106.

EXAMPLE VII

Three samples of butyl rubber (copolymer of 97% isobutylene and 3% isoprene) were cured for 60 minutes at 287° F. according to the following recipes:

| Sample | 1 | 2 | 3 |
|---|---|---|---|
| | G. | G. | G. |
| Zinc oxide | 5 | 5 | 5 |
| Carbon black | 15 | 15 | 15 |
| Gastex—Semi-reinforcing furnace black | 35 | 35 | 35 |
| Tuads—Tetramethyl thiuram disulfide | 1 | 1 | 1 |
| Captax—2-mercapto-benzothiazole | 0.5 | 0.5 | 0.5 |
| Sulfur | 2 | 2 | 2 |
| Mineral Oil | 10 | | |
| Unhydrogenated polymer of Example I | | 10 | |
| Hydrogenated polymer of Example III | | | 10 |
| Butyl rubber | 100 | 100 | 100 |

Sample 1 cured easily while sample 2 blistered badly, while sample 3 did not blister. The cured products had the following properties:

| Sample | 1 | 2 | 3 |
|---|---|---|---|
| Tensile/sq. in | 2,500 | 40 | 2,400 |
| Elongation, Percent | 680 | 0 | 650 |
| Modulus at 100° F | 980 | 0 | 1,000 |
| Mooney viscosity: | | | |
| ½ min | 51 | 51 | 50 |
| 3 min | 47 | 46 | 46 |
| 5 min | 45 | 44 | 43 |

EXAMPLE VIII

Various amounts of the hydrogenated polymer of Example III were added to a 160–180° F. oxidized Columbian asphalt. The following results were obtained.

*Physical properties of hydrogenated copolymer oil in asphalts*

| Percent Copolymer | Type of Asphalt | Softening Point, °F. | Penetrations | | | Susceptibility Factor |
|---|---|---|---|---|---|---|
| | | | 32° F. | 77° F. | 115° F. | |
| 0 | 160—180° F. Oxidized Columbian. | 176 | 16 | 28 | 53 | 1.70 |
| 0.5 | do | 165 | 5 | 16 | 49 | 3.20 |
| 1.0 | do | 164 | 4 | 18 | 51 | 4.25 |
| 2.0 | do | 165 | 5 | 17 | 52 | 2.83 |
| 5.0 | do | 159 | 6 | 17 | 59 | 2.86 |
| 10.0 | do | 150 | 16 | 32 | 100 | 2.07 |
| 15.0 | do | 141 | 24 | 50 | 162 | 1.96 |

NOTE.—Copolymer used had iodine number of 6, and at 1.5% in EMO #1 base oil it gave a vis. of 51.7 SSU and a V. I. of 127.

The asphalt used in the above example may be substituted by steam-reduced asphalts, oxidized asphalts, natural asphalts, coal tar asphalts, $CCl_4$-treated asphalts and $P_2O_5$-treated asphalts. The asphalts may have other resins and polymers present as well as some oil, wax, etc. Anti-oxidants, fillers, etc. may be present. A light solvent or water may be present to make a paint, etc.

As another embodiment of the instant invention, it is contemplated to acylate the hydrogenated copolymer described above with an acylating agent.

The acylating agent to be used in accordance with this invention for reacting with a copolymer of the above-described class may be selected from a wide variety of materials having the general formula $R(COX)_n$ where R is a hydrocarbon group, X is a halogen and $n$ is an integer from 1 to 3, preferably 1 to 2. The acylating agent most generally preferred is derived from a fatty acid, and when the product is to be employed as an additive for a lubricating oil, the hydrocarbon radical should comprise 5 to 30 carbon atoms acyl chlorides having from 10 to 20 carbon atoms in an alkyl group being especially desirable. Suitable acyl halides may be derived, for example, from palmitic acid, stearic acid, phenyl stearic acid, adipic acid, sebacic acid, coconut oil acids, commercial fat acids, mutton tallow fatty acids, arachidic acids and the like. Where solubility of the product in oil is not required, the acylating agent may be a short chain acyl chloride, such as acetyl chloride. Naphthenyl halides, derived from petroleum naphthenic acids, may also be used, as well as acid halides, derived from cyclohexane carboxylic acid, phthalic acid and the like. Slightly unsaturated acid halides may also be used as oleyl chloride. For making a plasticizer for synthetic rubber, lower acylating agents may be used, e. g. acetyl chloride, propionyl chloride, butyryl chloride, succinyl chloride, etc.

In carrying out the acylation reaction, it is desirable to employ from 1 to 10 parts by weight of acylating agent to 1 part of the copolymer, 1 to 5 parts of the acylating agent being preferred when a long chain acylating agent, of the order of 10 carbon atoms or more, is employed. The amount of acylating agent which it is desirable to use in a particular case will depend partly on the proportion of the combined cyclic constituent in the copolymer, as well as upon the molecular weight of the acylating agent, and upon the purpose for which the product is to be used.

The acylation is preferably carried out in the presence of a Friedel-Crafts type catalyst, such as aluminum chloride, zinc chloride, stannic chloride, boron fluoride, anhydrous hydrogen fluoride and the like. The amount of this catalyst required is generally from 0.5 to 3 parts per 1 part of copolymer. The catalyst is preferably added in small portions during the course of the reaction.

The reaction is preferably carried out in the presence of a suitable inert solvent, including highly halogenated hydrocarbons, such as carbontetrachloride, tetrachlorethane, o-dichlorbenzene and the like, as well as hydrocarbon solvents such as refined aliphatic hydrocarbons of the type of heavy naphtha, kerosene and the like. The amount of solvent may range from about 1 to 20 volumes or so per volume of the reactants present.

The temperature required for the acylating reaction depends partly upon the reactivity of the particular acylating agent used and partly upon the amount of solvent and the proportion of combined cyclic constituent in the copolymer, but normally will range from about 100° to about 300° F., preferably from 125° to 250° F.

The time required for the completion of the reaction may vary from ½ to 10 hours, depending upon the nature of the reactants and the temperature of the reaction, but the reaction will normally be completed within 1 to 5 hours. The completion of the reaction is evidenced by the substantial cessation of hydrogen chloride evolution. When the reaction is completed, the mixture may be cooled, and if very viscous, is then preferably diluted with additional solvent; and then the residual catalyst is destroyed by adding water, alcohol, aqueous hydrochloric acid, aqueous caustic soda, etc. The resulting catalyst sludge is then withdrawn and the solvent extract containing the desired acylated copolymer may be washed repeatedly, preferably until the final wash water shows no test for acid with litmus paper. The acylated copolymer may, if desired, be used in solution in the solvent if thus recovered, or the solvent may be removed by distillation or other suitable means so as to recover the acylated copolymer per se. If it is desired to use the acylated copolymer eventually in solution in a mineral lubricating oil, a small amount of such oil may be added to the volatile oil solution before evaporation of the volatile solvent so that after such evaporation the residue will consist of a mineral lubricating oil concentrate of the acylated copolymers, containing, for example, about 15% to 50% of such acylated copolymer. If the copolymer precipitates out of the solvent before or upon addition of the catalyst destroying or hydrolyzing agent, the copolymer may be washed by mixing, milling or kneading with water until freed of catalyst and then dried by hot mixing or vacuum drying, etc.

The copolymers as described above may also be sulfonated to obtain many desirable derivatives. The sulfonation is accomplished by use of a treating agent selected from the group consisting of acid-reacting compounds of an element capable of forming polybasic inorganic acids, and halogen-, organic-, and other substituted derivatives thereof, including acids of sulfur, phosphorus, arsenic, boron and the like, such as sulfuric acid, nitrosylsulfuric acid, fuming sulfuric acid, sulfur trioxide, phosphoric acid or sulfur pentoxy dichloride, sulfuryl thiocyanate ($SO_2(SCN)_2$) phosphorus pentoxide, a reagent made by dissolving phosphorus pentoxide in strong sulfuric acid, phosphorus halides such as phosphorus oxychloride or -oxybromide, or -oxybromchloride, and phosphorus trichloride, either alone or with a catalyst such as $AlCl_3$, Mg powder or using instead of the copolymer a Grignard reagent RMgX made by halogenating the copolymer and reacting with Mg powder to make phosphonic and phosphinic derivatives, or other acids such as chlorsulfonic acid, fluorsulfonic acid, and weaker acids such as sulfurous acid, sulfur dioxide, phosphorous acid, etc., may be used provided more stringent reaction conditions are used than are required with the stronger acids.

Organic-substituted acids include alkyl, aryl, alkaryl, aralkyl, cycloalkyl, alkoxy, etc. derivatives of these various acids where such an organic group replaces a hydroxyl group, oxygen, or a hydroxyl hydrogen atom as in methane, sulfonic acid, amyl phosphoric acid, dibutyl phosphoric acid, isopropyl sulfuric acid, etc.

A wide variety of different types of products can be obtained, not only by the use of various amounts of acid, and various concentrations of acid (as by the use of sulfuric acid of 65%, 95% or 120% strength), but also by starting with copolymers having the desired combination of physical and chemical properties which may be adjusted both by control of the proportions of styrene and diolefin.

The reaction may be carried out in the presence of an inert solvent such as refined petroleum naphtha or kerosene, etc. or chlorinated solvents such as ethylene dichloride, tetrachlorethane, $CCl_4$, nitromethane, white oils, etc. The reaction temperature should be about $-50°$ C. to $130°$ C., or $0°$ to $150°$ C., depending upon the strength of acid, amount of solvent, etc. The reaction may be carried out under vacuum or at atmospheric pressure or at various higher pressures such as 2, 10, etc. atmospheres or higher.

This application is a division of application Serial No. 432,936 filed May 27, 1954.

The nature of the present invention having been thus fully set forth and specific examples of the same given, what is claimed as new and useful and desired to be secured by Letters Patent is:

1. A mineral lubricating oil having added thereto, a viscosity-index improving amount of a hydrogenated polymer oil prepared by hydrogenating the oily polymer obtained by copolymerizing 50 to 100 parts by weight of butadiene-1,3 and 50 to 0 parts by weight of styrene in the presence of finely divided solium, said hydrogenated polymer having an iodine number below 150 (ASTM).

2. An improved lubricating oil composition which comprises a mineral lubricating oil base stock containing a minor but pour point depressing proportion of the reaction product of a chlorinated aliphatic compound with a hydrogenated polymer prepared by hydrogenating the oily polymer obtained by copolymerizing 50 to 100 parts by weight of butadiene-1,3 and 50 to 0 parts by weight of styrene in the presence of finely divided sodium, said hydrogenated polymer having an ASTM iodine number below 150.

3. A lubricating oil composition which comprises a mineral lubricating oil base stock containing a minor but extreme pressure resistance improving amount of the reaction product of a sulfide of phosphorus with a hydrogenated polymer prepared by hydrogenating the oily polymer obtained by copolymerizing 50 to 100 parts by weight of butadiene-1,3 and 50 to 0 parts by weight of styrene in the presence of finely divided sodium, said hydrogenated polymer having an ASTM iodine number below 150.

References Cited in the file of this patent
UNITED STATES PATENTS

| | | |
|---|---|---|
| 2,472,495 | Sparks | June 7, 1949 |
| 2,595,819 | Smyers | May 6, 1952 |
| 2,615,004 | Jasper | Oct. 21, 1952 |
| 2,686,759 | Giammaria | Aug. 17, 1954 |